United States Patent Office 3,505,379
Patented Apr. 7, 1970

3,505,379
PRODUCTION OF ORGANOSILANES
Eckhard Bonitz, Frankenthal, Pfalz, Germany, assignor to Badische Anilin- & Soda-Fabrik Aktiengesellschaft, Ludwigshafen (Rhine), Germany
No Drawing. Filed Aug. 25, 1965, Ser. No. 482,623
Claims priority, application Germany, Aug. 28, 1964, 1,693,073
Int. Cl. C07f 7/04, 7/06, 7/18
U.S. Cl. 260—448.8                          10 Claims

ABSTRACT OF THE DISCLOSURE

Production of organosilane by (1) liquid phase reaction of finely divided, dispersed silicon with alcohols or phenols at 20–300° C., in presence of a member from the group consisting of organic catalysts and liquid phase-soluble metals or metal compounds, and at atmospheric or superatmospheric pressure, and, (2) reaction of resulting silanes with unsaturated organic compounds at 20–360° C. and 0–200 atmospheres gauge.

---

It is known that the following procedure may be adopted for the production of organosilanes, for example ethyltriethoxysilane.

In the first step of the process, ethyltrichlorosilane is prepared from silicon, ethyl chloride and hydrogen chloride or from silicon, ethylene and hydrogen chloride:

(1)    $Si + C_2H_5Cl + 2HCl \rightarrow C_2H_5SiCl_3 + H_2$ (2)    $Si + CH_2{=}CH_2 + 3HCl \rightarrow C_2H_5SiCl_3 + H_2$ In the second stage of the process, ethyltrichlorosilane is reacted with ethanol in the presence of ammonia to form ethyltriethoxysilane and ammonium chloride. Anhydrous hydrogen chloride may be recovered from the ammonium chloride by treatment with sulfuric acid, thus giving, in addition to the ethyltriethoxysilane, an equimolar amount of ammonium sulfate. The net result of these reactions may be represented thus:

(3)    $C_2H_5SiCl_3 + 3C_2H_5OH \rightarrow C_2H_5Si(OC_2H_5)_3 + 3HCl$

The production of vinyltriethoxysilane takes place via the intermediate stage of trichlorosilane. Trichlorosilane is reacted with acetylene to form vinyltrichlorosilane and this is converted into vinyltriethoxysilane by a method analogous to Equation 3:

(4)    $Si + 3HCl \rightarrow HSiCl_3 + H_2$ (5)    $HSiCl_3 + CH{\equiv}CH \xrightarrow{Pt} CH_2{=}CHSiCl_3$ Phenylalkoxysilanes are obtained analogously from silicon and chlorobenzene via the stage of phenylchlorosilanes.

I have found that organosilanes are obtained by reacting finely divided silicon, in the presence or absence of a liquid silicon compound, in liquid neutral or acid phase with an unsubstituted or substituted alcohol or an unsubstituted or substituted phenol, if desired separating the silane formed from the reaction mixture, reacting the silane formed with an unsaturated organic compound, in the presence or absence of a conventional catalyst, and if desired reacting the organosilane formed with water to form an organosilanol or organosiloxane.

It is characteristic of the process according to this invention that the stage of organochlorosilanes (present in the prior art methods) is omitted. The expensive recovery of anhydrous hydrogen chloride is thus also unnecessary. The process according to this invention is capable of great variation. In contrast to this, the synthesis of organochlorosilanes by the prior art methods as an economic proposition is possible only with methyl chloride, ethyl chloride or chlorobenzene.

Silicon in the present specification is defined as commercial silicon, for example a silicon containing 80 to 99% Si, which contains no additional catalysts.

By finely divided silicon is meant a silicon which has been reduced in size to a particle size of for example 100 to 0.1 micron by grinding, advantageously in the absence of oxygen. Smaller particle sizes than this can only be obtained with difficulty under industrial conditions, whereas larger particles than this do no react well with the alcohol. It is particularly advantageous to use as the agent for excluding oxygen the liquid reaction product (or a portion thereof) which has been obtained in earlier reactions of the same type.

Examples of liquid organic diluents are hydrocarbons, esters, ethers, ketones or acetals, which may be substituted. Specific examples of such liquids are: benzene, toluene, xylene, gasoline, kerosine ethyl acetate, isomyl acetate, phenyl propionate, diethyl ether, dibutyl ether, tetrahydrofuran, dioxane, glycol dimethyl ether, acetone, methyl ethyl ketone, acetaldehyde, dimethylacetal, diethyl phthalate, dibutyl phthalate, diphenyl, diphenyl oxide, anisol, acetophenone, paraffin oil, kogasin, diesel oil or chlorobenzene.

Silanes, which are formed by the process according to this invention as intermediates, include:

(1) Monosilanes having the general formula:

$H_aSi(OR)_{4-a}$ (in which $a$=zero, 1, 2, 3 or 4 and R=alkyl or phenyl), for example $HSi(OCH_3)_3$, $H_2Si(OC_2H_5)_2$, $SiH_4$, $(CH_3O)_4Si$ and

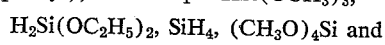

(2) Disilanes having the general formula:

$H_aSi(OR)_{3-a}$—$Si(OR)_{3-b}H_b$ (in which $a$=zero, 1, 2 or 3 and $b$=zero, 1, 2 or 3 and $a$ may be identical with or different from $b$ and R=alkyl or phenyl), for example $HSi(OCH_3)_2$—$Si(OCH_3)_2H$, $H_2SiOCH_3$—$Si(OCH_3)_2$ and $Si(OCH_3)_3$—$Si(OCH_3)_3$;

(3) Polysilanes having the general formula:

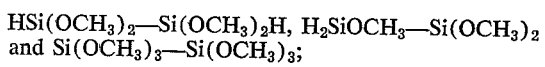

(in which $n$=3, 4, 5, 6 up to about 30 and in which R=alkyl or phenyl) in which the silane hydrogen bonds may be wholly or partly substituted by alkoxy or phenoxy groups;

(4) Polysilanes having the general formula:

(in which n=3, 4, 5, 6 up to about 30 and R=alkyl or phenyl) in which the silane hydrogen bonds may be wholly or partly substituted by alkoxy or phenoxy groups.

The liquid silicon compounds may be liquid inorganic or organic silanes, as for example $C_2H_5Si(OC_2H_5)_3$, $Si(OC_2H_5)_4$, $(C_2H_5)_3Si_2(OCH_3)_3$,

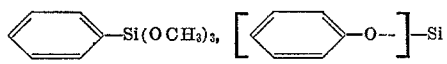

or

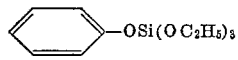

The term "in the liquid phase" is to be understood as meaning that the finely divided silicon is dispersed in a liquid phase. This liquid phase may be formed by a liquid diluent, by a liquid alcohol or by a liquid phenol. It is therefore not necessary in every case for the alcohol or the phenol as such to be liquid. For example a gaseous or vaporous alcohol or a vaporous or solid phenol may be introduced into a liquid diluent and then reacted with silicon. It is essential only that the finely divided silicon be dispersed in a liquid phase. Reaction may be carried out at temperatures of 20° to 300° C., particularly from 100° to 200° C.

The impurities in commercial silicon, mainly iron, calcium, aluminum, magnesium and potassium, form more or less basic alcoholates with the added alcohol. If good yields of alkoxysilane hydrides are to be achieved, these alcoholates must at least be neutralized by continuous addition of acid, for example anhydrous hydrogen chloride or chlorosilanes; it is better, however, for the reaction mixture always to contain a small amount of Si-Cl. To achieve this, for example an alkyl halide, aryl halide or acyl halide, such as $CH_3Cl$, $C_2H_5Cl$, $C_6H_5Br$ or $CH_3COCl$, may be mixed with the alcohol.

Chlorosilanes or organochlorosilanes may also be co-employed if an appropriate vessel material is used which is stable to alcoholic or phenolic hydrochloric acid. Examples of chlorosilanes or organichlorosilanes are: $SiCl_4$, $HSiCl_3$, $C_2H_5SiCl_3$, $C_6H_5SiCl_3$ and $(CH_3)_2SiCl_2$. In this case, silanes are obtained in which the alkoxy groups or phenoxy groups are partly replaced by chlorine because the silanes first formed react further with the diluent. The reaction between silicon and alcohol may also be initiated by adding the same compounds.

If a plurality of reactions is to be carried out in series it is recommendable to use at least a portion of the liquid reaction products obtained in the reaction as the diluent in the following reactions. These liquid reaction products are mixtures of silicon compounds which contain for example disilanes or polysilanes having the general formula 2 to 4.

The reactions proceed at atmospheric pressure or at superatmospheric pressure. Increase in pressure increases the speed of reaction. Pressures of 10 to 25 atmospheres gauge are in general adequate but it is sometimes advantageous to increase the pressure until it reaches the vapor pressure of the liquid alcohol. For example conventional low pressure or medium pressure stirred vessels are suitable for carrying out the reactions.

It is advantageous to carry out the reactions below the critical temperature of the alcohol used, i.e., usually below 250° C.

The reactions may readily be carried out continuously.

It it is desired to achieve high yields of hydride, an excess of silicon is used, i.e., the silicon component of the reaction mixture is only partly used up and is replenished periodically or continuously.

Examples of alcohols which may be used are: methanol, ethanol, n-propanol, n-butanol, isobutanol, glycol monomethyl ether, ethylene glycol, glycerol, allyl alcohol, cyclohexanol or mixtures of the same. Methanol has the most rapid reaction. If desired methanol may be mixed with an alcohol which does not react readily.

Examples of phenols which may be used are: o-chlorophenol, m-chlorophenol, p-chlorophenol, pyrocatechol, resorcinol, hydroquinone, o-cresol, m-cresol, p-cresol, methyl salicylate.

The reaction may be carried out in the presence of metals or metal compounds of the sub-group elements, for example copper, nickel, zinc, silver, iron, platinum or palladium, which may be added as metal powders or as compounds which are soluble in the liquid phase, for example as halides, acetylacetonates, carbonyls or salts of carboxylic acids. Examples of such compounds are: copper(2) formate, copper(2) acetylacetonate, nickel acetylacetonate, nickel carbonyl, copper(2) acetate, zinc acetate, zinc chloride, zinc bromide, copper(1) chloride, platinum chloride, Raney silver, Raney nickel, iron(3) chloride, iron pentacarbonyl. In principle, the reactions proceed without adding these metals or metal compounds.

Examples of conventional catalysts are: $H_2PtCl_6$, platinized asbestos, $Fe(CO)_5$, peroxides or other radical starters, ultraviolet light or other high-energy radiation, $TiCl_4$, $SnCl_4$, Pd on $Al_2O_3$, Pd on $CaCO_3$ or $BaCO_3$, tributylamine, pyridine, N-dimethylformamide, triphenyl phosphine, $H_2SnCl_6$, $ZrCl_4$, colloidal Fe and butyl titanate.

Examples of unsaturated organic compounds are:

olefins, for example ethylene, propylene, butylene, isobutylene, methylbutene, 2-methylpentene-1, octene-3, octene-1, cyclohexene, pinene, cyclooctene, styrene, α-methylstyrene, vinyltoluenes, p-divinylbenzene;

polyolefins, for example butadiene, isoprene, cyclopentadiene, cyclooctadiene, cyclododecatriene, cyclooctatetraene, methylheptatriene, piperylene;

olefinically unsaturated polymers, such as natural rubber, cis-1,4-polyisoprene, polybutadiene oil;

vinyl chloride, vinyl acetate, vinyl propionate, acrylonitrile, ethyl acrylate, methyl methacrylate, methacrylic acid, alkenylsilanes, for example vinyltrimethoxysilane, methylvinyldimethoxysilane;

vinylpyridine, acrolein diacetal;

allyl chloride, methallyl chloride, allyl bromide, allyl alcohol, allyl acetate, allylamine, diallyl ether;

allyl trimethoxysiloxane, diallyldiethoxysilane, allyl ethyl ether;

trifluoro propene, difluoropropene;

also acetylene and acetylene compounds, for example methylacetylene, phenylacetylene, butinediol, propargyl acetate, methylisobutinylamine, propargylamine;

or aromatics, for example benzene, toluene, xylenes, naphthalene, phenol, chlorobenzene, anisol, aniline, diethylaniline, methylaniline, fluorobenzene, chloronaphthalene, diphenyl, diphenyl ether, diphenyl oxide, diphenylamine.

Reaction of the silane or silane mixture with the unsaturated compound takes place at temperatures of 20° to 360° C., particularly from 80° to 150° C., pressures of 0 to 200 atmospheres gauge, particularly 0 to 60 atmospheres gauge, being maintained.

The organosilanes have the following formulae:

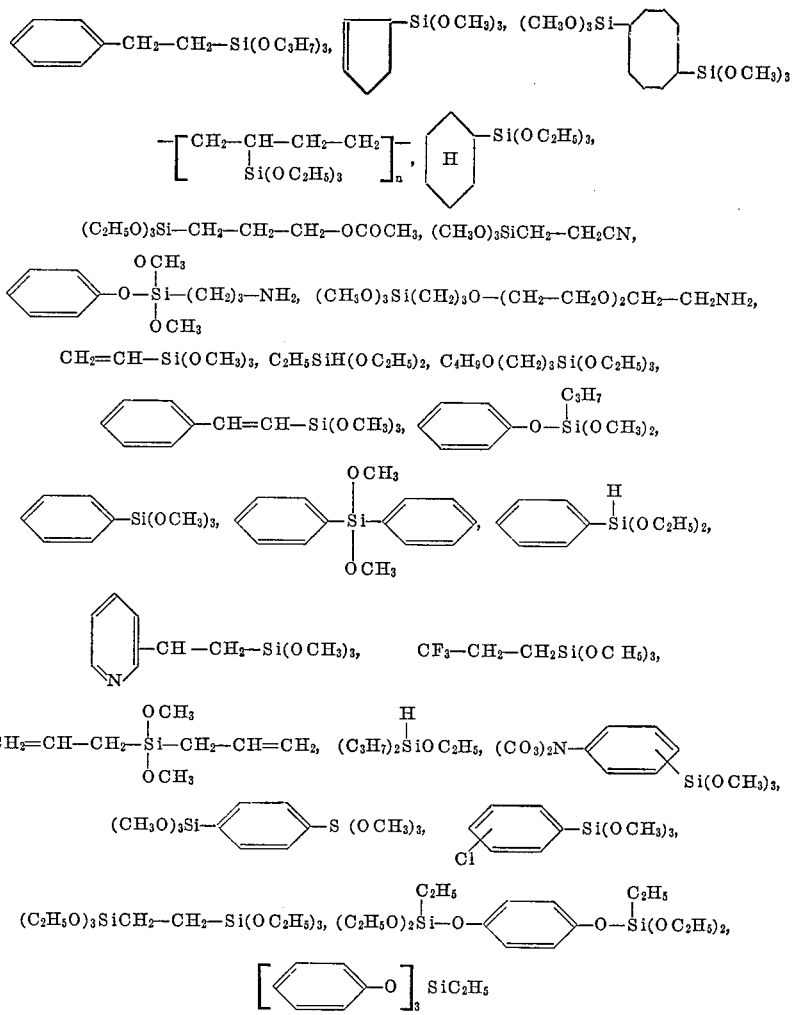

The organosilanes obtainable according to the present invention are known. They may be used as intermediates for the production of valuable silicon compounds. For example by reacting organosilanes bearing hydrolyzable groups with water, the known organosilanols are obtained which can be polycondensed to form organosiloxanes. In the case of organoalkoxysilanes there is formed as by-product alcohol which may be separated and used again for reaction with silicon. In this way it is possible to obtain organosiloxanes from silicon, unsaturated compounds and water using alcohol in circulation.

Such a reaction may be represented for example as follows:

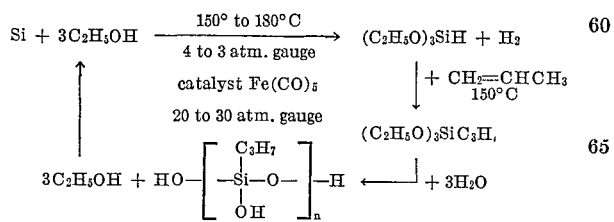

($n$ less than or equal to 20) monopropylmonohydroxypolysiloxane.

Adding on of the unsaturated compound to the silane takes place according to the following general equation:

$$\equiv SiH + CH_2 = CH - R \rightarrow \equiv SiCH_2 - CH_2 - R$$

R being an organic radical.

Reaction with water takes place by cleaving the Si—OR' bond, for example as follows:

$$RSi(OR')_3 + 3H_2O \rightarrow RSi(OH)_3 + R'OH \qquad (I)$$

(R=an organic radical attached via carbon to silicon; R'=an alkyl or phenyl radical).

The organosilanol (I) may be polycondensed for example as follows:

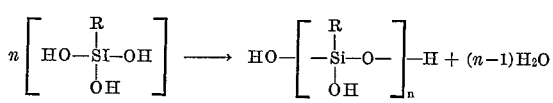

(R being an organic radical).

The following examples illustrate how the process according to this invention may be carried out. Parts are by weight.

EXAMPLE 1

3,000 parts of commercial silicon (98% of Si) are ground in 5,000 parts of tetraethoxysilane and 500 parts of ethanol (as described in German patent specification No. 1,079,607 but without the catalyst) until the mean particle size is from 1 to 100 microns. This mixture is charged under nitrogen into a stirred vessel capable of being heated so that it occupies about one tenth of the volume of the vessel. The vessel is heated while stirring to 150° C. and the reaction between silicon and ethanol is initiated by adding about 30 parts of dry hydrogen chloride, which may originate from the reaction:

$$\equiv SiCl + C_2H_5OH \rightarrow \equiv SiOC_2H_5 + HCl$$

($\equiv SiCl$ being any chlorosilane).

Commencement of the reaction is recognizable by a rise in temperature of the reaction mixture. About 500 to 1,000 parts of liquid ethanol is then passed into the mixture per hour. A pressure which is somewhat higher than the vapor pressure of the ethanol develops at first. As the reaction proceeds, a pressure of from about 2 to 4 atmospheres gauge is set up, under which the silicon dissolves in the ethanol and is converted into a liquid ethoxysilane mixture. Hydrogen which develops is allowed to escape through a cooler. Substantially the two following reactions occur side by side:

(1) $\quad Si + 3C_2H_5OH \rightarrow HSi(OC_2H_5)_3 + H_2$ (2) $\quad Si + 2C_2H_5OH \rightarrow H_2Si(OC_2H_5)_2$ These equations are merely summary and do not give any products formed intermediately.

If the reaction be carried out as described above in a stirred vessel, an overall reaction proceeds which approximately corresponds to a condition between the ideal reaction (2) and the less ideal, but still very valuable, reaction (1).

The secondary reaction (3):

(3) $\quad Si + 4C_2H_5OH \rightarrow Si(OC_2H_5)_4 + 2H_2$ i.e., pure silicate formation, should certainly be avoided, but is possible with quantitative yield for example if the reaction be carried out in the presence of basic substances.

When the reactions (1) and (2) are over, the level of the liquid in the container has risen accordingly. Liquid propylene is then added by means of a metering pump to the mixture until a pressure of about 20 to 30 atmospheres gauge has been developed (at 140° to 150° C.). In most cases there is an immediate slight development of heat which is liberated by addition of Si-H to the olefinic double bond:

$$\equiv SiH + CH_2 = CH - R \rightarrow \equiv SiCH_2 - CH_2R$$

(R being an organic radical.)

If it is desired that this reaction should proceed quantitatively, there are substantially two necessary criteria, namely:

(I) Raising the temperature, and
(II) Adding conventional catalysts.

For example by using temperatures of 140° to 150° C. in the presence of iron pentacarbonyl (in the present case about 150 parts), the Si-H addition to propylene is completed after about three hours. A sample of the reaction mixture is withdrawn and tested for Si-H for example with aqueous-alcoholic silver nitrate solution. If the Si-H test is negative (no deposition of silver) the reaction mixture is heated gradually to about 250° C. and the vapors developing are distilled through a condenser while gradually expanding to atmospheric pressure. The propylethoxysilane mixture obtained may then be reacted with water to the corresponding propyl polysiloxane which dissolves in the alcohol liberated by the reaction.

EXAMPLE 2

The procedure of Example 1 is followed but the liquid ethoxysilane mixture is gassed out through a condenser and allowed to flow as a liquid into a second stirred vessel in which 1,200 parts of liquid propylene is added for each 1,500 parts of ethoxysilane mixture. The mixture is then heated to 100° C. and about 10 parts of a $10^{-3}$-molar solution of $H_2PtCl_6$ in propanol is added. The mixture heats up. The reaction is over after about one hour. The reaction product has the following approximate composition:

| | Percent |
|---|---|
| $C_3H_7Si(OC_2H_5)_3$ | 30 |
| $(C_3H_7)_2Si(OC_2H_5)_2$ | 15 |
| $(C_3H_7)SiOC_2H_5$ | 5 |
| $Si(C_3H_7)_4$ | 1 |
| $Si(OC_2H_5)_4$ | The remainder |

EXAMPLE 3

The procedure of Example 2 is followed but the addition of propylene to the ethoxysilane hydrides is stopped prematurely. A propylethoxysilane mixture is obtained in which about 10% of $C_3H_7SiH(OC_2H_5)_2$ is present.

EXAMPLE 4

3,000 parts of an active silicon suspension in 8,000 parts of propyltriethoxysilane is reacted per hour in a vertical tube (diameter: 80 mm.) with about 3,000 parts of anhydrous ethanol by allowing ethanol and silicon suspension to flow at about 190° C. and a hydrogen pressure of 200 atmospheres gauge upwardly through the tube at such a rate that at the top of the tube the silicon has substantially passed into solution as ethoxysilane hydride. It is allowed to overflow through an overflow pipe having a throttle valve into a stirred autoclave in which an ethylene pressure of about 100 atmospheres gauge is maintained. The ethylene addition takes place in the course of about twenty minutes in the presence of platinum on a carrier substance, for example asbestos. The product is expanded through a condenser and the corresponding ethylethoxysilanes are obtained analogously to Examples 2 and 3. About 2% of disilylethane derivatives, for example:

$$(C_2H_5O)_3SiCH_2-CH_2Si(OC_2H_5)_2$$
$$\qquad\qquad\qquad\qquad\quad |$$
$$\qquad\qquad\qquad\qquad\;\; C_2H_5$$

are also obtained.

EXAMPLE 5

The procedure of Example 4 is followed but acetylene is reacted instead of propylene and the pressure in the reactor is produced not with hydrogen but with carbon monoxide. Corresponding vinylethoxysilanes are obtained.

EXAMPLE 6

The procedure of Example 4 is adopted, the ethoxysilane mixtures leaving the first tube is mixed with benzene (1:1 parts by weight) and the mixture is allowed to flow through another tube in which a temperature of 260° C. is maintained. The benzene contains 0.1% by weight of boron trichloride. Phenyltriethoxysilane and phenyldiethoxysilane

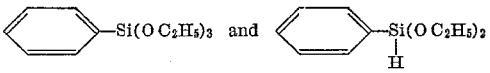

may be isolated from the reaction product.

EXAMPLE 7

The procedure of Example 4 is followed but allyl acetate is added instead of ethylene to the silane mixture. The products obtained include:

$$(C_2H_5O)_3Si(CH_2)_3OCOCH_3$$

The following should be remarked:

If triethoxysilane $(C_2H_5O)_3SiH$ be prepared in known manner from $HSiCl_3$ and $C_2H_5OH$ and fractionated (boiling point 129° C. to 132° C. at 760 mm. Hg) and an attempt be made to react it with propylene (40 atmospheres gauge) at 150° C. and in the presence of $Fe(CO)_5$ as catalyst, a conversion of 2 to 5% is achieved in a period of two to three hours. If the alkoxysilane mixture obtained by direct action of alcohol on 98% Si be used, however, this reacts to the extent of about 30% in the same period without any catalyst. Quantitative reaction with propylene is achieved by adding conventional catalysts, particularly Fe(CO)₅ or H₂PtCl₆.

The alcohol may be recovered for example as follows: A mixture of 1,000 parts of ethyltriethoxysilane, 1,200 parts of water and 1 part of sulfuric acid is placed in a stirred vessel of glass or enamelled iron. The whole is heated for three hours at 80° to 90° C. while stirring. The whole is then cooled to room temperature. The two layers which form are separated.

One consists of liquid ethylsiloxanol containing about 20 to 30% of ethanol dissolved therein. The other consists of a mixture of water and ethanol.

After neutralization of the sulfuric acid with calcium hydroxide, the alcohol is separated from both layers by distillation. The alcohol obtained contains about 4% of water which is removed in the conventional way by adding benzene followed by azeotropic distillation. The practically anhydrous alcohol is returned to the reaction:

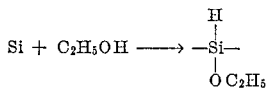

EXAMPLE 8

The procedure of Example 2 is at first followed, but then the silane mixture is added by means of a metering pump to the bottom of a vertical pressure tube (diameter: 40 mm.) which is surrounded by electrical heating means by which the contents of the tube can be heated to a maximum of about 360° C. An ethylene pressure of 200 to 250 atmospheres is maintained in the tube. At the top of the pressure tube the liquid passes through a cooler into a separator and is then continuously expanded through a valve and discharged. After a residence time of one to five hours at a temperature of 260° to 280° C., the addition of the SiH bonds to ethylene has substantially taken place. About 60 mole percent of the SiH bonds originally present are to be found as SiC₂H₅ groups. With longer residence times and higher temperatures in the tube, a certain amount of telomerization products is found in the reaction product, these having been formed by reaction of a plurality of moles of ethylene with one SiH bond:

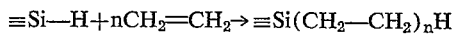

I claim:

1. A process for production of organosilanes which comprises reacting at 20–300° C. finely divided silicon having particle sizes in the range of 0.1 to 100 microns dispersed in liquid phase with a member selected from the group consisting of methanol, ethanol, n-propanol, n-butanol, isobutanol, glycol monomethyl ether, ethylene glycol, glycerol, allyl alcohol, cyclohexanol, mixtures thereof, phenol, o-chlorophenol, m-chlorophenol, p-chlorophenol, pyrocatechol, resorcinol, hydroquinone, o-cresol, p-cresol, and methyl salicylate to produce alkoxy-substituted or phenoxy-substituted silane hydrides, and reacting at 20–360° C. said hydrides with an organic unsaturated compound selected from the group consisting of mono-olefins, monomeric polyolefins, olefinically unsaturated organic polymers, alkenylsilanes, monomeric allyl compounds, difluoropropene, trifluoropropene, acetylene, acetylene compounds, benzene, toluene, xylene, naphthalene, chlorobenzene, anisol, aniline, diethylaniline, methylaniline, fluorobenzene, chloronaphthalene, diphenyl, diphenyl ether, diphenyl oxide and diphenylamine.

2. A process as claimed in claim 4 wherein said liquid phase reaction is conducted at 100–200° C. and at 0–25 atmospheres gauge.

3. A process as claimed in claim 2 wherein the reaction of said hydrides with said organic unsaturated compound is conducted at 80–150° C. and at 0–200 atmospheres gauge.

4. A process as claimed in claim 2 wherein said temperature is below the critical temperature of the alcohol or phenol employed in the liquid phase reaction.

5. A process as claimed in claim 1 wherein said silicon is commercial silicon containing 80–99% Si and wherein said member is ethanol.

6. A process as claimed in claim 1 wherein the liquid phase reaction is conducted in the presence of liquid phase-soluble metals or metal compounds wherein the metal is selected from the group consisting of copper, nickel, zinc, silver, iron, platinum, titanium, tin and zircon.

7. A process as claimed in claim 1 wherein said liquid phase reaction is conducted in an inert organic diluent in which said finely divided silicon is dispersed.

8. A process as claimed in claim 1 wherein the resultant silane hydrides are separated from the reaction mixture prior to their reaction with said organic unsaturated compound.

9. A process as claimed in claim 1 wherein chlorosilanes or organochlorosilanes are coemployed as reactive components in the liquid phase reaction.

10. A process as claimed in claim 1 wherein the liquid phase reactant is one of said alcohols, the resultant organosilanes of the process of claim 1 are hydrolyzed to polycondense said organosilanes and produce polysiloxanes with formation of alcohol as a byproduct, and said alcohol is separated and used as a reactant in said liquid phase reaction.

References Cited

UNITED STATES PATENTS

| | | |
|---|---|---|
| 2,637,738 | 5/1953 | Wagner. |
| 2,650,204 | 8/1953 | Reynolds et al. __ 260—448.2 XR |
| 2,823,218 | 2/1958 | Speier et al. |
| 2,970,150 | 1/1961 | Bailey _____ 260—448.2 XR |
| 3,072,700 | 1/1963 | deWit _____ 260—448.8 |
| 3,159,601 | 12/1964 | Ashby _____ 260—448.2 XR |
| 3,159,662 | 12/1964 | Ashby. |
| 3,232,972 | 2/1966 | Beanland _____ 260—448.2 |

OSCAR R. VERTIZ, Primary Examiner

P. F. SHAVER, Assistant Examiner

PO-1050
(5/69)

UNITED STATES PATENT OFFICE
CERTIFICATE OF CORRECTION

Patent No. 3,505,379    Dated April 7, 1970

Inventor(s) Eckhard Bonitz

It is certified that error appears in the above-identified patent and that said Letters Patent are hereby corrected as shown below:

Column 2, line 17, "no" should read --not--; line 25, "kerosine ethyl acetate, isomyl" should read --kerosine, ethyl acetate, isoamyl--; line 42, that portion of the formula reading "SH" should read -- SiH --.

Column 3, line 69, "mula" should read --mulae--.

Column 5, in the sixth line of formulas, that portion of the formula reading "OCH$_3$" should read -- OCH$_3$ --;
                |          |
                Si        Si in the tenth line, that portion of the formula reading "(OCH$_5$)$_3$" should read -- (OC$_2$H$_5$)$_3$ --; in the eleventh line, that portion of the formula reading "(CO$_3$)$_2$" should read -- (CH$_3$)$_2$ --.

Column 10, line 8, claim 2, "4" should read -- 1 --.

Column 10, line 54, in the references, "Beanland_____260-448.2" should read -- Beanland_____260-448.8 --.

Column 10, in the references, insert -- Eaborn, "Organosilicon Compounds", Academic Press Inc., N.Y. (1960), pp. 67 and 228-230. --.

SIGNED AND
SEALED
AUG 18 1970

(SEAL)
Attest:

Edward M. Fletcher, Jr.
Attesting Officer

WILLIAM E. SCHUYLER, JR.
Commissioner of Patents